(12) United States Patent
Ogawa et al.

(10) Patent No.: US 10,579,100 B2
(45) Date of Patent: Mar. 3, 2020

(54) DOCKING DEVICE

(71) Applicant: LENOVO (SINGAPORE) PTE. LTD., Singapore (SG)

(72) Inventors: Tetsuo Ogawa, Kanagawa (JP); Kazuya Tatsuno, Kanagawa (JP); Yoshiyuki Shibayama, Kanagawa (JP)

(73) Assignee: LENOVO SINGAPORE PTE LTD, Singapore (SG)

( * ) Notice: Subject to any disclaimer, the term of this patent is extended or adjusted under 35 U.S.C. 154(b) by 0 days.

(21) Appl. No.: 16/386,985

(22) Filed: Apr. 17, 2019

(65) Prior Publication Data

US 2019/0317554 A1 Oct. 17, 2019

(30) Foreign Application Priority Data

Apr. 17, 2018 (JP) .................................. 2018-78897

(51) Int. Cl.
*G06F 1/16* (2006.01)
*H05K 5/00* (2006.01)
*H05K 7/00* (2006.01)

(52) U.S. Cl.
CPC .......... *G06F 1/1632* (2013.01); *G06F 1/1616* (2013.01)

(58) Field of Classification Search
CPC .............................. G06F 1/1616; G06F 1/1632
USPC ........................................ 361/679.41–679.44
See application file for complete search history.

(56) References Cited

U.S. PATENT DOCUMENTS

| 5,504,649 | A | * | 4/1996 | Hosoya | G06F 1/1616 361/679.32 |
| 9,915,977 | B1 | * | 3/2018 | Chu | G06F 1/1632 |
| 10,074,935 | B2 | * | 9/2018 | Kato | H01R 13/518 |
| 2013/0005179 | A1 | * | 1/2013 | Aldana | G06F 1/1632 439/529 |
| 2013/0058021 | A1 | * | 3/2013 | Numata | G06F 1/1632 361/679.01 |
| 2014/0118923 | A1 | * | 5/2014 | Stanley | G06F 1/1626 361/679.41 |
| 2015/0103483 | A1 | * | 4/2015 | Lin | G06F 1/1632 361/679.43 |
| 2016/0062399 | A1 | * | 3/2016 | Hsu | G06F 1/1601 361/679.21 |
| 2016/0062400 | A1 | * | 3/2016 | Hsu | G06F 1/1632 361/679.21 |
| 2017/0153667 | A1 | * | 6/2017 | Suckle | G06F 1/1632 |
| 2018/0364756 | A1 | * | 12/2018 | Lee | G06F 1/1632 |

FOREIGN PATENT DOCUMENTS

JP 2010-257202 A 11/2010
JP 2017-146698 A 8/2017

* cited by examiner

*Primary Examiner* — Anthony M Haughton
(74) *Attorney, Agent, or Firm* — Russell Ng PLLC; Antony P. Ng (57) ABSTRACT

A docking device is provided. A portable information device can be removably attached to a docking device. The docking device includes first and second connectors that are connected to connection terminals provided on the portable information device. The docking device further includes: a first substrate with the first connector mounted thereon; a second substrate with the second connector other than the first connector mounted on the first substrate mounted thereon; and a substrate connecting member that connects between the first and second connectors in a floating state that allows relative displacement.

9 Claims, 11 Drawing Sheets

DOCKING DEVICE

The present application claims benefit of priority under 35 U.S.C. §§ 120, 365 to the previously filed Japanese Patent Application No. JP2018-78897 with a priority date of Apr. 17, 2018, which is incorporated by reference herein.

TECHNICAL FIELD

The present invention relates to docking devices in general, and in particular to a docking device to which a portable information device can be removably attached.

BACKGROUND

It is often the case that a portable information device configured to be lightweight and compact in consideration of portability is limited in its functions as well. For example, a laptop PC may also be limited in functions to make it lightweight and thin. Such a laptop PC is provided with a docking device as an exclusive device for expanding the functions of the laptop PC. The docking device is connected to the laptop PC via a connector, thereby expanding the functions of the laptop PC.

For example, a docking device in which a connector to be connected to a connection terminal formed on a bottom surface of a laptop PC is provided in order to project from a device placement portion of the docking device on which the bottom surface lands. Furthermore, a docking device in which a horizontal connector is provided on a side of its device placement portion and is connected to a connection terminal provided on a side surface of a portable information device.

When a docking device like those described above is docked with a portable information device, a vertical or horizontal connector is connected to a connection terminal of the portable information device. Therefore, if the connector of the docking device and the connection terminal of the portable information device are misaligned, the connector is not allowed to be smoothly and certainly connected to the connection terminal. However, since the connection and the connection terminal are mounted on substrates, it is necessary to allow for some misalignment. Furthermore, a horizontal connector tends to be at some distance from a positioning portion in which a portable information device is positioned. Therefore, there are a lot of parts lying between the positioning portion and the connector, and manufacturing tolerances or manufacturing errors of the parts are accumulated, thus the position accuracy of the connector may be reduced further. Moreover, when multiple connectors and connection terminals are configured to be arranged in parallel, the pitch among the connectors or among the connection terminals can be easily varied, and smooth connection of a connector is likely to be more difficult.

Consequently, it would be desirable to provide an improved docking device capable of connecting a connector to a connection terminal of a portable information device.

SUMMARY

In accordance with an embodiment of the present disclosure, a docking device to which a portable information device is able to be removably attached includes multiple connectors that are connected to multiple connection terminals provided on the portable information device; a first substrate with, of the multiple connectors, some connectors mounted thereon; a second substrate with, of the multiple connectors, connectors other than the connectors mounted on the first substrate mounted thereon; and a substrate connecting member that connects between the connectors mounted on the first substrate and the connectors mounted on the second substrate in a floating state that allows relative displacement.

With the above-mentioned configuration, even if there is misalignment due to a manufacturing tolerance or a manufacturing error occurs, for example, in the pitch between the connection terminals of the portable information device, the pitch between the connectors mounted on the substrates is automatically adjusted by floating. Therefore, the connectors can be smoothly and certainly connected to the connection terminals.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
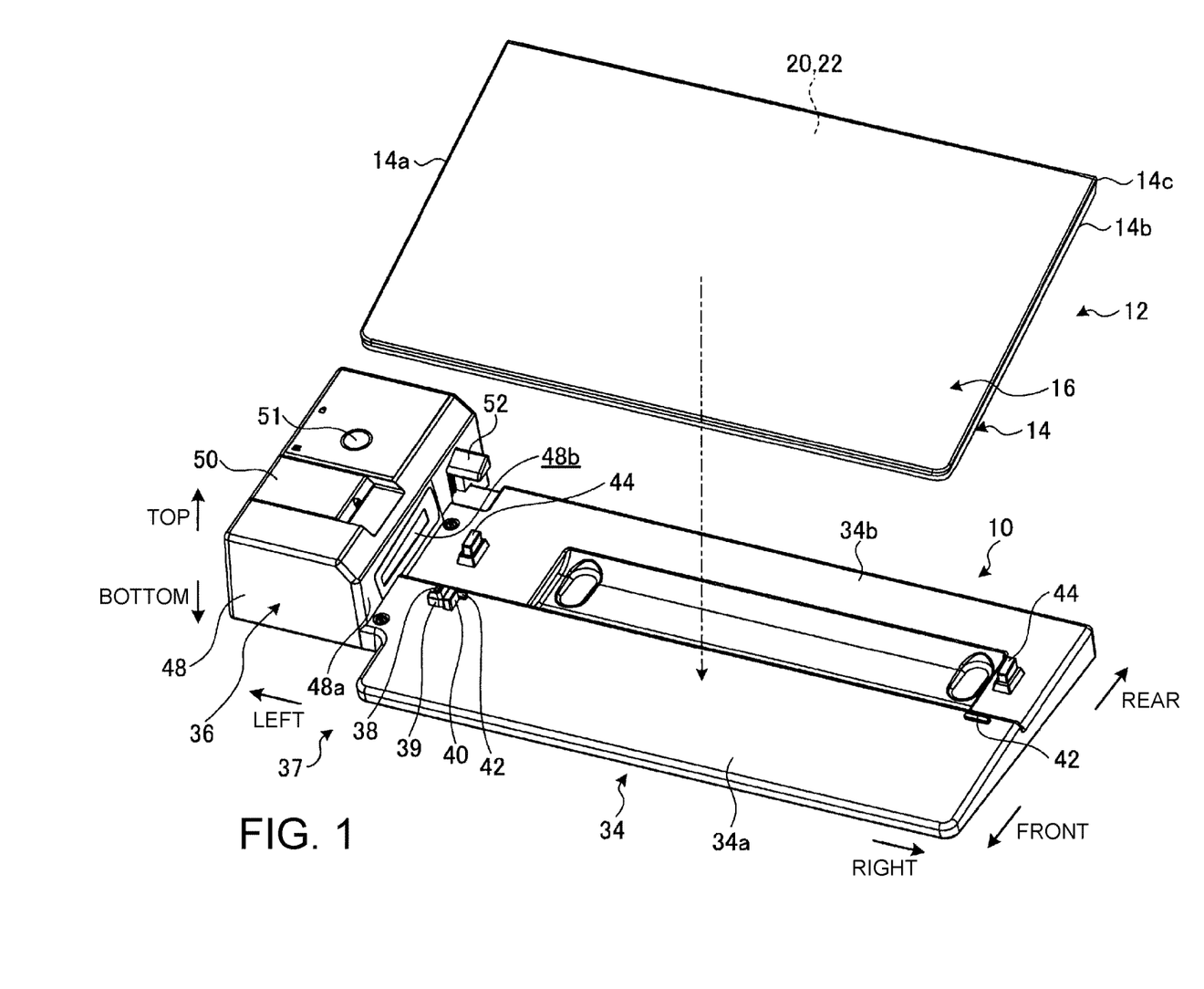
FIG. 1 is an exploded perspective view illustrating an operation of docking a portable information device with a docking device according to an embodiment of the present invention.
Figure 2:
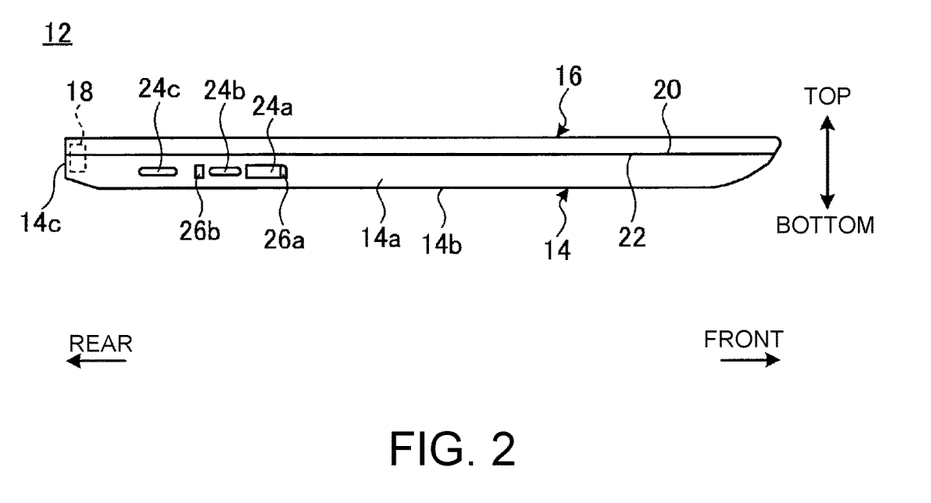
FIG. 2 is a side view of the portable information device.

FIG. 1 is an exploded perspective view illustrating an operation of docking a portable information device 12 with a docking device 10 according to an embodiment of the present invention. FIG. 2 is a side view of the portable information device 12. The docking device 10 according to the present embodiment can removably attach the portable information device 12, such as a laptop PC, thereto. The docking device 10 expands the functions of the attached portable information device 12, such as connecting the portable information device 12 to multiple peripheral devices and a network. The docking device 10 can also be used for expansion of a portable information device other than a laptop PC, and may be used for expansion of the functions of, for example, a tablet PC, a cell-phone, a smartphone, an electronic organizer, or the like.

Hereinafter, based on a state where the docking device 10 is equipped with the portable information device 12, the near and back sides of the devices in FIG. 1 are referred to as the front and the rear, respectively; the thickness direction of the docking device 10 and the portable information device 12 is referred to as the top and bottom; and the width direction of the devices is referred to as the right and left.

As shown in FIG. 2, the portable information device 12 that is an example of an object to be connected to the docking device 10 is a clamshell type that a display chassis 16 is openably/closably joined to a main body chassis 14 by a hinge 18. The portable information device 12 is provided with a keyboard 20 on a top surface of the main body chassis 14 and a display 22 on an undersurface of the display chassis 16. On a left side surface (a side surface 14a) of the main body chassis 14, connection terminals 24a, 24b, and 24c and guide holes 26a and 26b are provided.

The connection terminals 24a to 24c are arranged in parallel in a front-rear direction on the rear end side of the side surface 14a. The connection terminals 24a to 24c can be connected to connectors 30a to 30c (see FIG. 6) of the docking device 10, respectively. By connecting the connectors 30a to 30c to the connection terminals 24a to 24c, the docking device 10 is electrically connected to the portable information device 12. This allows the portable information device 12 to use various expanded functions that the docking device 10 has. The connection terminals 24a to 24c and the connectors 30a to 30c may be configured to have, for example, a two-port structure or the like, besides a three-port structure.

Figure 3:
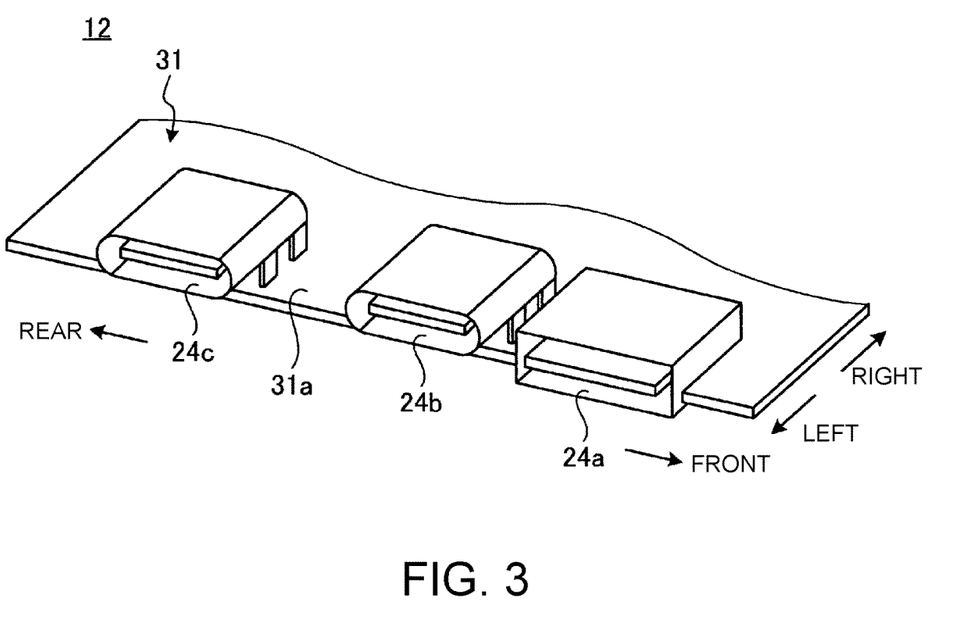
FIG. 3 is an enlarged perspective view of a main part showing an example of a connection terminal of the portable information device.

In the case of the present embodiment, the connector 30a and the connection terminal 24a conform to, for example, the RJ-45 (modular) connection standard. The connectors 30b and 30c and the connection terminals 24b and 24c conform to, for example, a connection standard based on the universal serial bus (USB) Type-C standard. Accordingly, in the portable information device 12, at least the connection terminals 24b and 24c are surface-mounted on one surface 31a of a device-side substrate 31 provided inside the main body chassis 14 as shown in FIG. 3. In the case of the present embodiment, the connection terminal 24a is mounted on the device-side substrate 31 through a through-hole.

As shown in FIG. 2, the guide holes 26a and 26b are provided so as to be aligned with the connection terminals 24a to 24c. Guide pins 32a and 32b (see FIG. 6) provided across the connectors 30a and 30b of the docking device 10 are inserted into the guide holes 26a and 26b, respectively. By inserting the guide pins 32a and 32b into the guide holes 26a and 26b, the connectors 30a to 30c and the connection terminals 24a to 24c are both positioned and certainly and smoothly connected. The respective numbers of the guide holes and guide pins installed may be changed, or they may be omitted.

Figure 4:
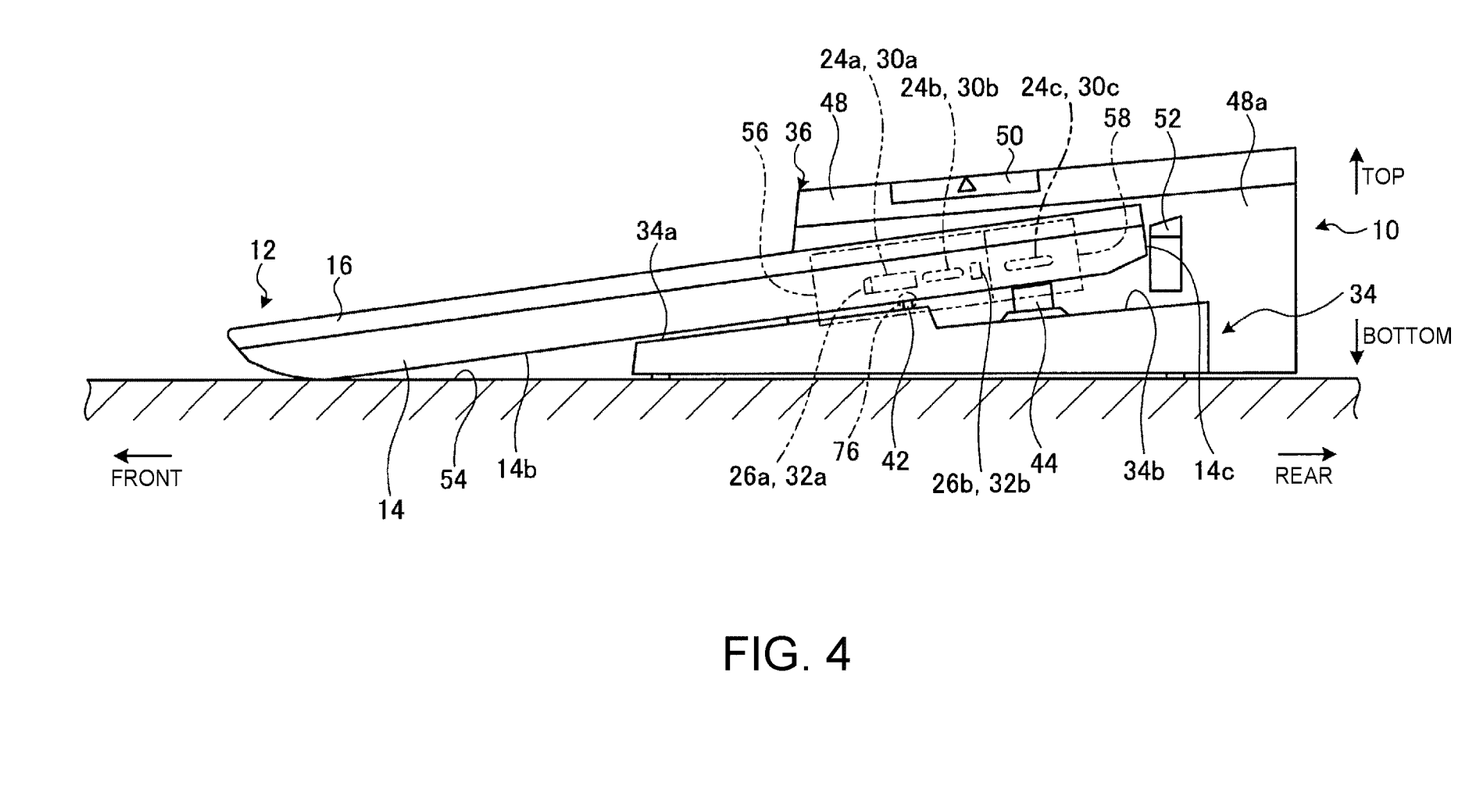
FIG. 4 is a side view showing a state where the portable information device is attached to the docking device.

FIG. 4 is a side view showing the docking device 10 with the portable information device 12 attached thereto. As shown in FIGS. 1 and 4, the main body chassis 14 of the portable information device 12 is placed on the docking device 10. The docking device 10 includes a device chassis 37 composed of a device placement portion 34 and a connection mechanism section 36.

The device placement portion 34 is a thin box body that is made of resin or the like and has a top surface on which, for example, approximately rear-side half of the portable information device 12 can be placed. The device placement portion 34 includes a placement table 34a on which a bottom surface 14b of the portable information device 12 is placed. The placement table 34a is an inclined surface that is inclined so that its height dimension gradually increases from the front side toward the rear side. On the rear side of the placement table 34a, a flank portion 34b formed one step lower than the placement table 34a is provided. The flank portion 34b is a hollow for avoiding a battery, etc. (not shown) in case the battery, etc. project from a rear undersurface of the portable information device 12.

Figure 5:
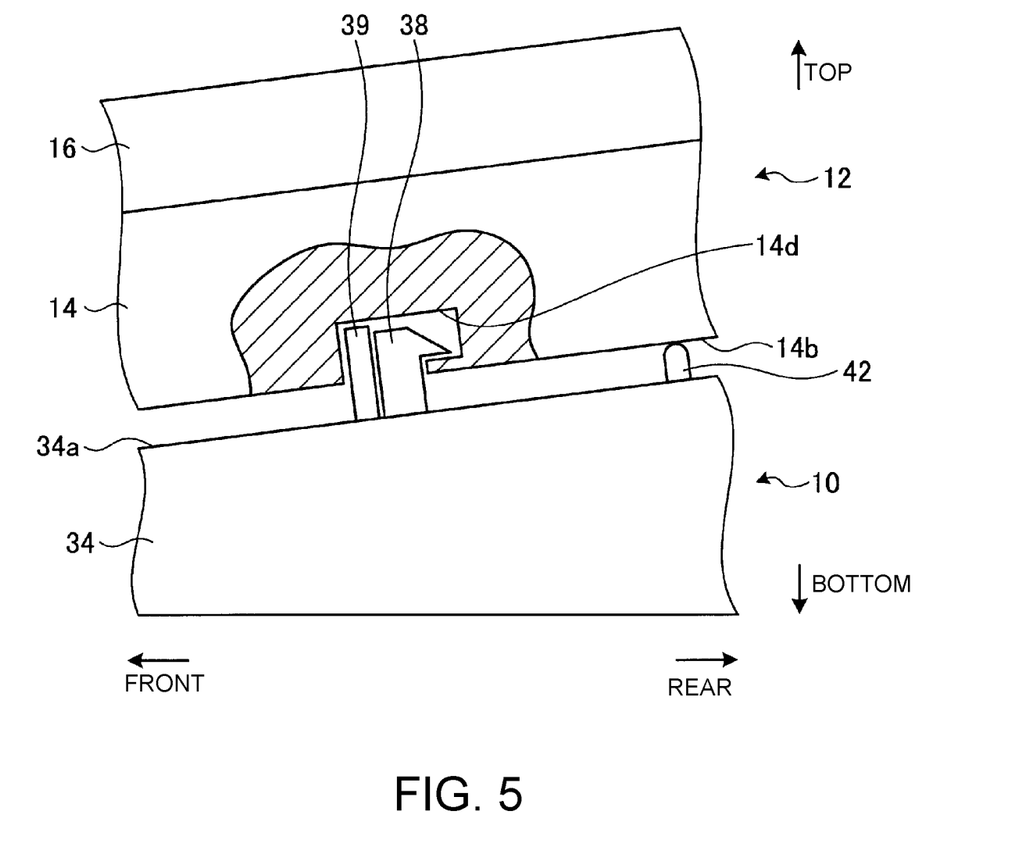
FIG. 5 is a partially enlarged cross-sectional view schematically showing an engagement structure of a hook and an engagement hole.

An engagement projection 38, a guidepost 39, and a detection pin 40 project from near a left end of the top surface of the placement table 34a. A hook portion of the engagement projection 38 of which the upper end is bent rearward is elastically biased toward the rear. As shown in FIG. 5, the engagement projection 38 can be engaged with an engagement hole 14d provided on the bottom surface 14b of the portable information device 12. The engagement of the engagement projection 38 with the engagement hole 14d stops the portable information device 12 from coming out from the device placement portion 34 to the top or the bottom. The guidepost 39 is a positioning part that is inserted into the engagement hole 14d together with the engagement projection 38 and positions the portable information device 12 in the front, rear, right, and left. The detection pin 40 can be depressed by the bottom surface 14b of the portable information device 12.

On the right and left ends of the top surface of the placement table 34a, leg members 42 for supporting the bottom surface 14b of the portable information device 12 are provided. The leg members 42 are, for example, a prismatic projection extending in a right and left direction, and is made of resin or hard rubber or the like.

The flank portion 34b is provided with support legs 44 on right and left ends of its top surface. The support legs 44 each supports a rear-end-side portion of the bottom surface 14b of the portable information device 12 placed on the placement table 34a. The support legs 44 are, for example, provided so as to be able to move up and down, and can support the portable information device 12 at a predetermined height position by using an elastic member or stopper mechanism (not shown), etc.

The connection mechanism section 36 has a cuboid box body 48 made of resin or the like. The box body 48 has a height dimension greater than the device placement portion 34. The box body 48 has a side surface 48a that stands at a side of the device placement portion 34 and faces the side surface 14a of the portable information device 12 placed on the device placement portion 34. The connectors 30a to 30c and the guide pins 32a and 32b are retractable from an opening 48b formed on the side surface 48a in the right and left direction toward the side surface 14a of the portable information device 12.

An operation lever 50 and a power button 51 are provided on a top surface of the box body 48. The operation lever 50 is an operation unit for extending and retracting the connectors 30 from the opening 48b. The power button 51 is a button for turning the power to the docking device 10 on/off.

The connection mechanism section 36 has a positioning member 52 on the rear side of the opening 48b. The positioning member 52 projects from the side surface 48a toward the right side. The positioning member 52 comes in contact with a rear end surface 14c of the portable information device 12 placed on the device placement portion 34 and positions a front and rear position of the portable information device 12. The positioning member 52 is provided so as to be able to move up and down without interfering with the opening-closing movement of the display chassis 16, and, generally, is elastically biased upward.

As shown in FIG. 4, the docking device 10 is generally used by being placed on a flat use surface 54, such as a top surface of a desk. When the portable information device 12 has been attached to the docking device 10, the front end side of the bottom surface 14b lands on the use surface 54, and the rear end side of the bottom surface 14b takes a forward-sloping angle posture in contact with and supported by the leg members 42 on the placement table 34a.

Figure 6:
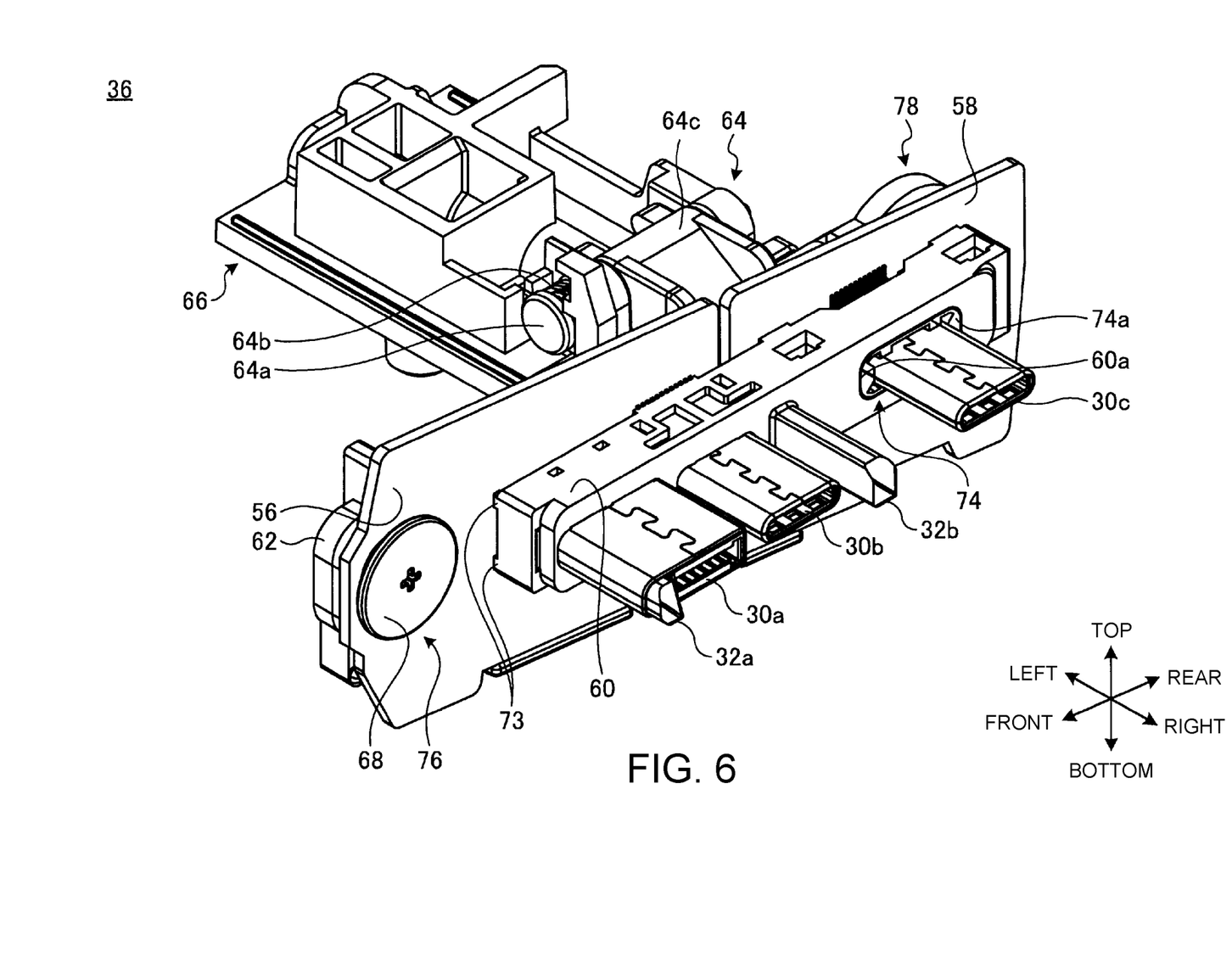
FIG. 6 is a perspective view showing a configuration example of the connectors and their surroundings.
Figure 7:
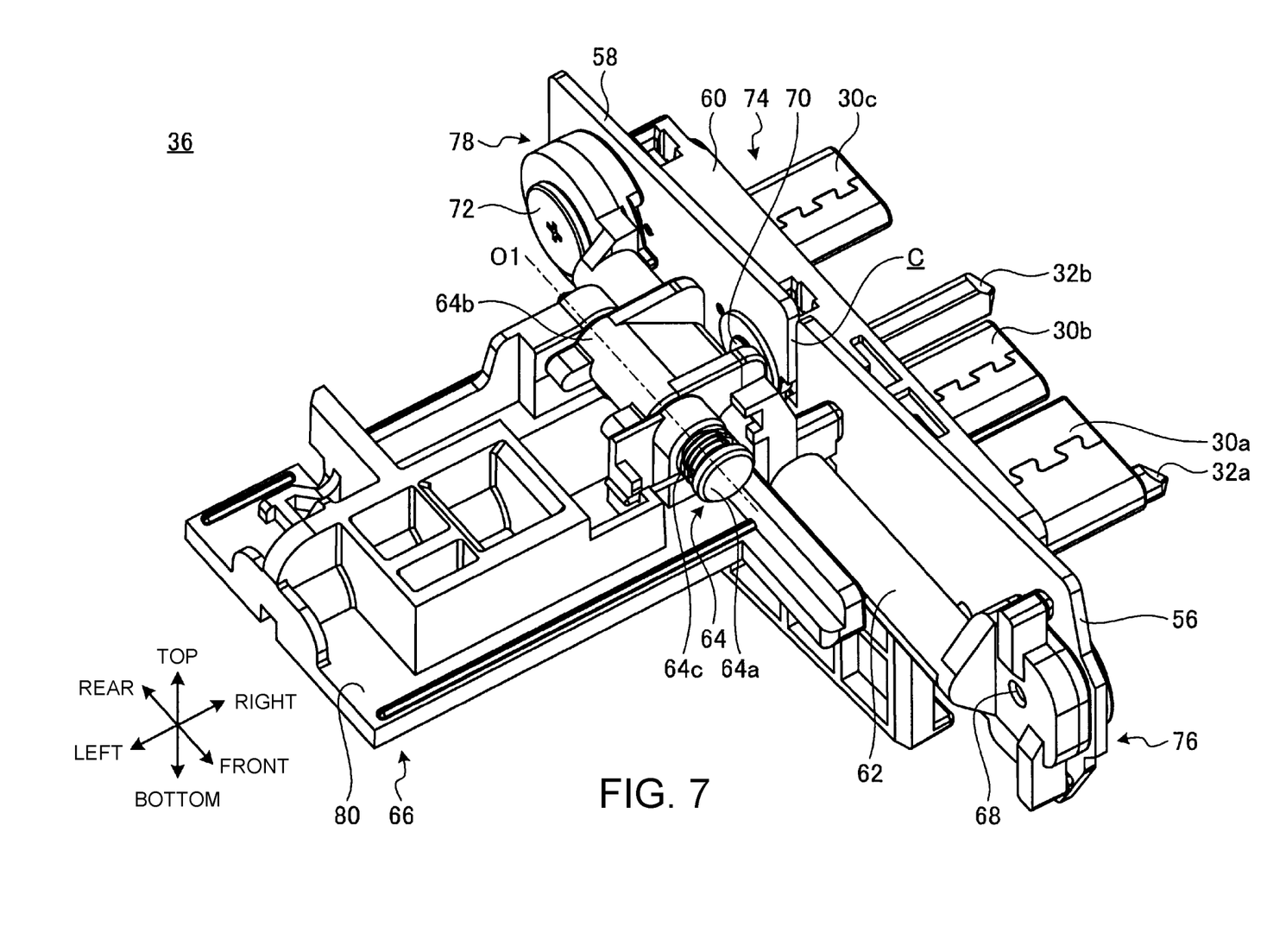
FIG. 7 is a perspective view of the connectors and their surroundings shown in FIG. 6 when viewed from another angle.
Figure 8:
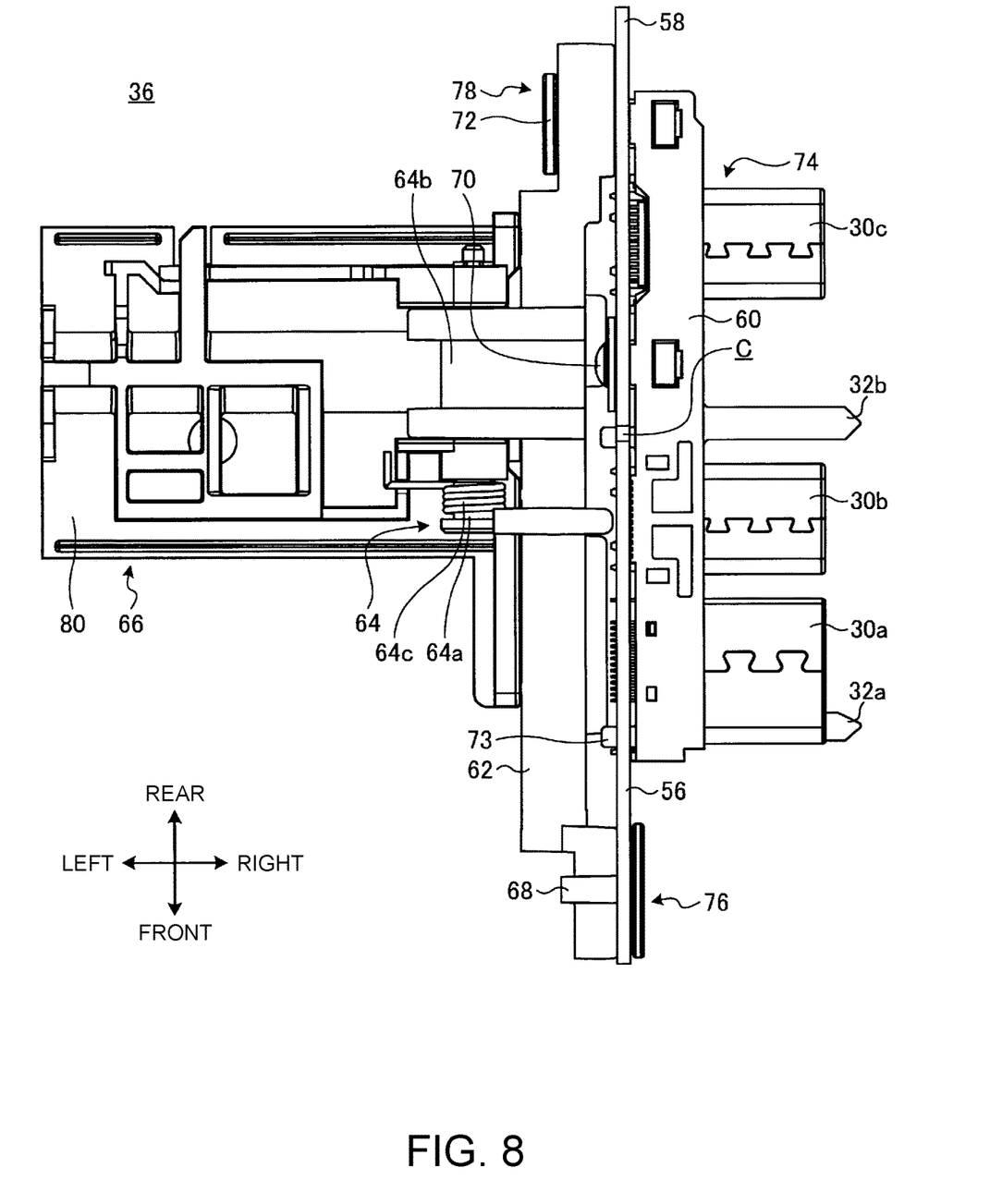
FIG. 8 is a plan view of the connectors and their surroundings shown in FIG. 6.
Figure 9:
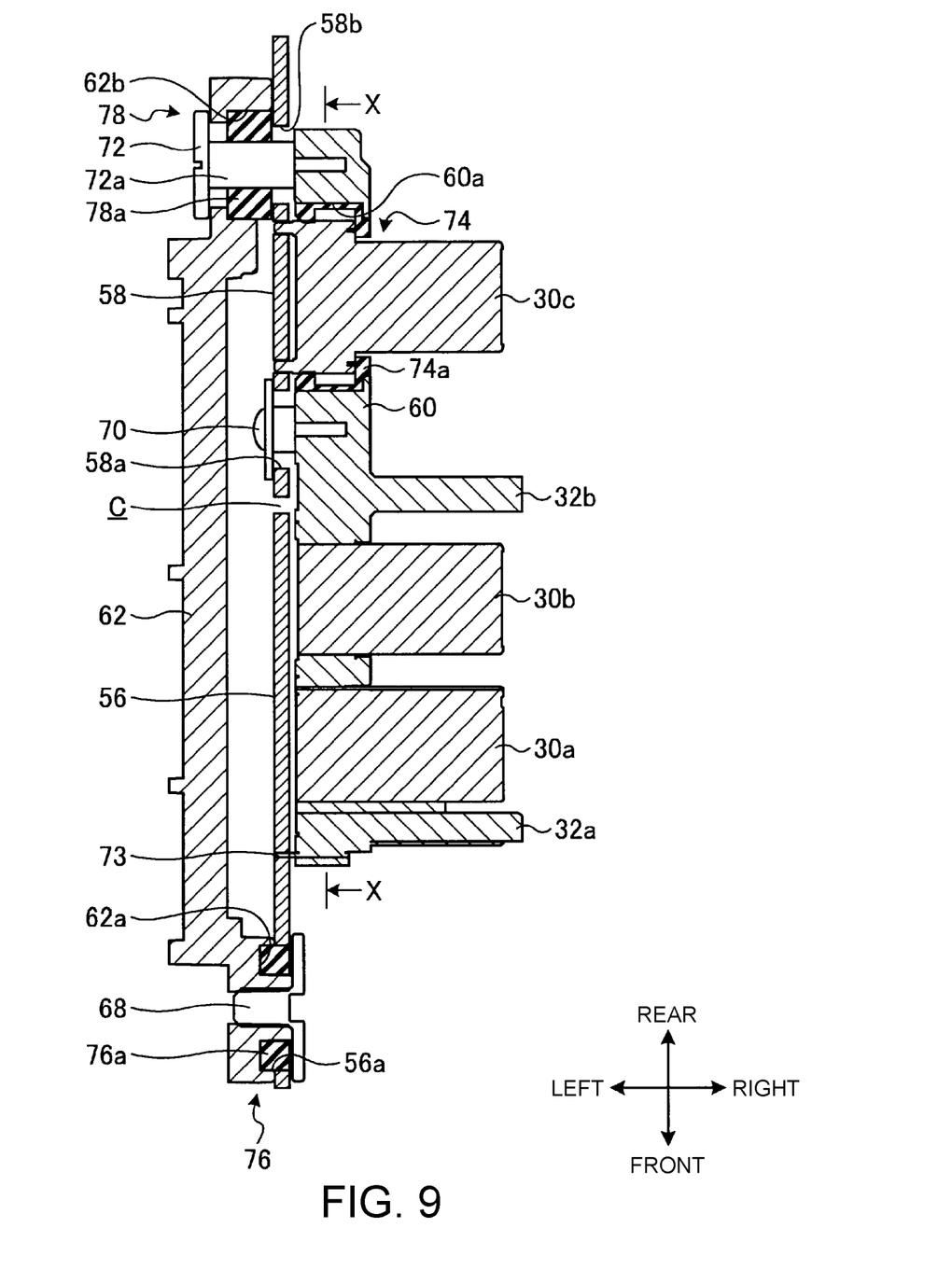
FIG. 9 is a cross-sectional plan view of the connectors and their surroundings.
Figure 10:
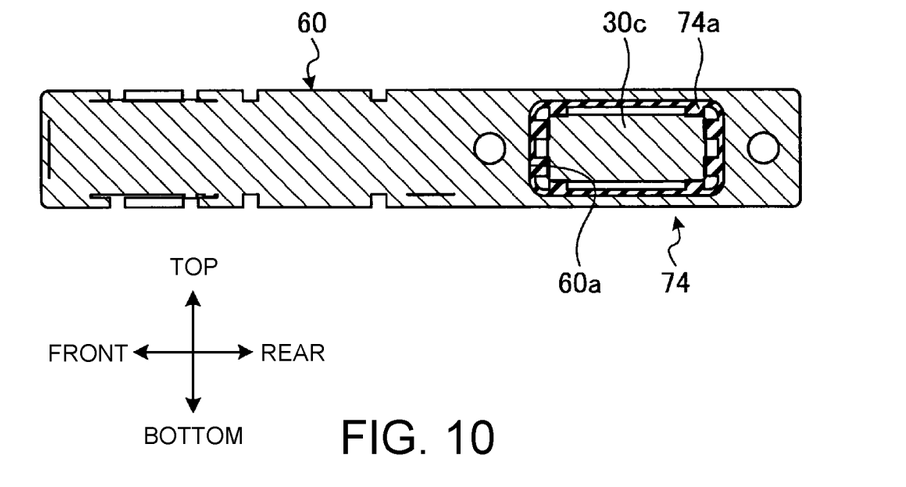
FIG. 10 is a cross-sectional view of the connectors and their surroundings along a line X-X in FIG. 9.

Subsequently, a specific configuration example of the connectors 30 and their surroundings is described. FIG. 6 is a perspective view showing a configuration example of the connectors 30 and their surroundings. FIG. 7 is a perspective view of the connectors 30 and their surroundings shown in FIG. 6 when viewed from another angle. FIG. 8 is a plan view of the connectors 30 and their surroundings shown in FIG. 6. FIG. 9 is a cross-sectional plan view of the connectors 30 and their surroundings. FIG. 10 is a cross-sectional view of the connectors 30 and their surroundings along a line X-X in FIG. 9.

As shown in FIGS. 6 to 9, the connection mechanism section 36 of the docking device 10 includes first and second substrates 56 and 58, a substrate connecting member 60, a support member 62, a rotation mechanism 64, and a retractable mechanism 66.

The first substrate 56 is an electronic substrate with the connectors 30a and 30b mounted thereon, and is a plate-like member extending in a front and rear direction. The connectors 30a and 30b are provided so as to project from a right-side front surface of the first substrate 56, and are aligned in the front and rear direction. The front end of the first substrate 56 is fastened to the support member 62 with a screw 68. The second substrate 58 is an electronic substrate with the connector 30c mounted thereon, and is a plate-like member extending in the front and rear direction. The second substrate 58 is located on the same plane as the first substrate 56 and behind the first substrate 56. The connector 30c is provided so as to project from a right-side front surface of the second substrate 58. The front end of the second substrate 58 is supported by the substrate connecting member 60 with a stepped screw 70, and the rear end is supported between the substrate connecting member 60 and the support member 62 with a stepped screw 72 (see FIGS. 8 and 9). The connectors 30a to 30c are aligned in the front and rear direction. A gap C is formed between proximal end surfaces of the substrates 56 and 58 (see FIG. 9).

The substrate connecting member 60 is a rectangular rod-like housing member extending in the front and rear direction along the right-side front surfaces of the substrates 56 and 58. The substrate connecting member 60 connects between the first substrate 56 and the second substrate 58, and holds the connectors 30a to 30c. The guide pins 32a and 32b are provided on the substrate connecting member 60. The front end of the substrate connecting member 60 is fitted and fixed to the first substrate 56 with a pin 73, and the approximately center part in the front and rear direction is connected to the second substrate 58 with the stepped screw 70, and then the rear end is connected to the support member 62 with the stepped screw 72 (see FIGS. 8 and 9). A large-diameter hole (an unloaded hole) 58a larger than a stepped portion of the stepped screw 70 is formed on the second substrate 58 (see FIG. 9). The stepped screw 70 fastens the second substrate 58 and the substrate connecting member 60 through the large-diameter hole 58a, and this allows the second substrate 58 to be movably held around the stepped portion.

As shown in FIGS. 9 and 10, the substrate connecting member 60 has a rectangular opening 60a on its rear end, and the connector 30c is inserted into this opening 60a. A rectangular frame-like floating material 74a is press-fitted to an inner circumferential wall surface of the opening 60a. The floating material 74a is made of an elastic member, such as rubber. On the inside of an opening of the floating material 74a, a plurality of fins projecting inward are arranged in a circumferential direction; the connector 30c is held by the fins (see FIG. 10). Thus, the substrate connecting member 60 supports the connector 30c (the second substrate 58) in a floating state. That is, the substrate connecting member 60 supports the connector 30c through a floating mechanism 74 using the floating material 74a. It is to be noted that in FIG. 10, an illustration of the other connectors 30a and 30b is omitted. The floating mechanism 74 may be configured, for example, to use an elastic member, such as a spring, against the substrate connecting member 60 so that the substrate connecting member 60 elastically supports the connector 30c (the second substrate 58).

As shown in FIGS. 7 to 9, the support member 62 is a rod-like member extending in the front and rear direction along left-side front surfaces of the substrates 56 and 58. The front end of the support member 62 supports the first substrate 56 through the screw 68, and the rear end supports the second substrate 58 and the substrate connecting member 60 through the stepped screw 72.

As shown in FIG. 9, the front end of the support member 62 is provided with an annular recessed portion 62a so as to surround the outer circumferential side of a threaded hole into which the screw 68 is screwed. The annular recessed portion 62a has an opening to the side of the first substrate 56, and a support hole 56a formed on the first substrate 56 is located at the edge of this opening. The support hole 56a has about the same diameter as the annular recessed portion 62a. An annular floating material 76a is press-fitted to the annular recessed portion 62a and the support hole 56a. The floating material 76a is made of an elastic member, such as rubber. Thus, the support member 62 supports the first substrate 56 and the second substrate 58 connected to the first substrate 56 through the substrate connecting member 60 in a floating state. That is, the support member 62 supports the substrates 56 and 58 through a floating mechanism 76 using the floating material 76a. The floating mechanism 76 may be configured, for example, to use an elastic member, such as a spring, against the support member 62 so that the support member 62 elastically supports the first substrate 56.

As shown in FIG. 9, a large-diameter hole (an unloaded hole) 62b having a diameter larger than a stepped portion 72a of the stepped screw 72 is formed on the rear end of the support member 62. A large-diameter hole (an unloaded hole) 58b having a diameter larger than the stepped portion 72a of the stepped screw 72 is formed on the second substrate 58. The large-diameter holes 58b and 62b are concentrically adjacent to each other. The stepped screw 72 fastens the support member 62 and the substrate connecting member 60 through the large-diameter holes 62b and 58b, and this allows the second substrate 58 and the substrate connecting member 60 to be movably held around the stepped portion 72a.

An annular floating material 78a is press-fitted to the large-diameter hole 62b of the support member 62. The floating material 78a is made of an elastic member, such as rubber. The stepped portion 72a of the stepped screw 72 is press-fitted to a through-hole formed on the center of the inside of the floating material 78a. Thus, the support member 62 supports the stepped screw 72 and the substrate connecting member 60 connected to the stepped screw 72 in a floating state, and at the same time, supports the second substrate 58 in a floating state. That is, the support member 62 supports the substrates 56 and 58 through a floating mechanism 78 using the floating material 78a. The floating mechanism 78 may be configured, for example, to use an elastic member, such as a spring, against the support member 62 so that the support member 62 elastically supports the substrate connecting member 60 (and the second substrate 58).

Figure 11:
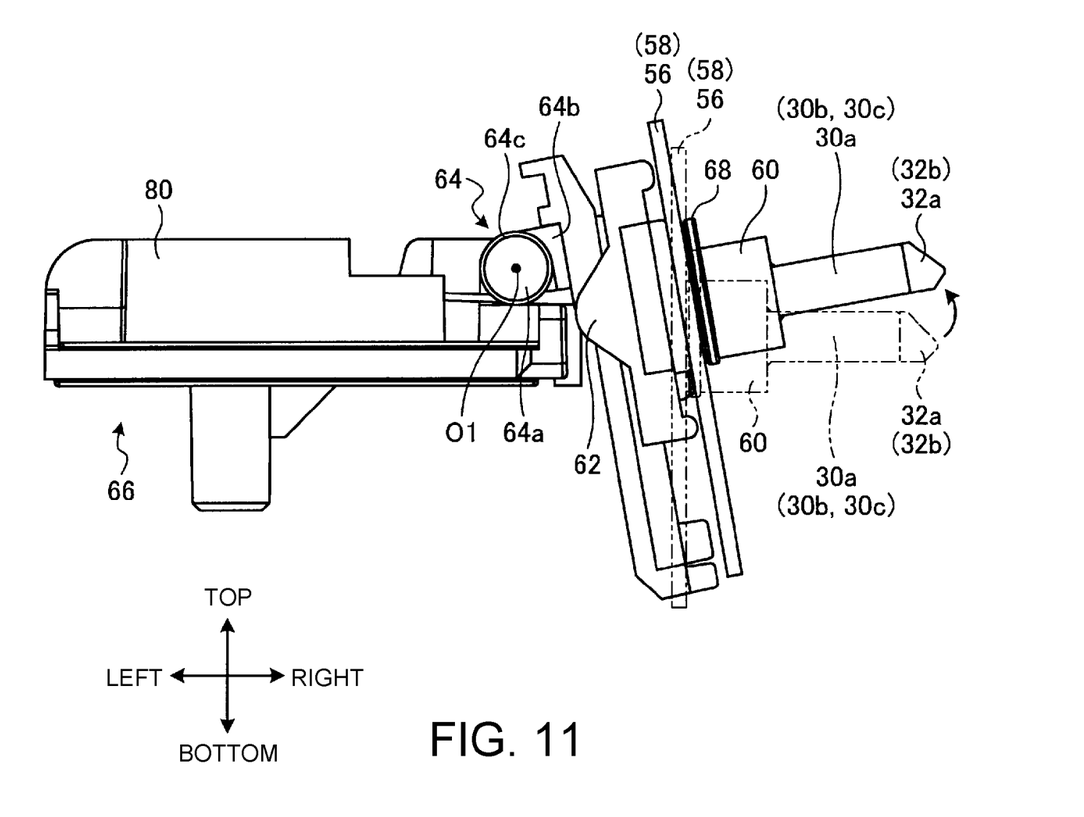
FIG. 11 is a front view of the connectors and their surroundings shown in FIG. 6.

FIG. 11 is a front view of the connectors 30 and their surroundings shown in FIG. 6, and illustrates a state where the rotation mechanism 64 is in operation.

As shown in FIGS. 6-8 and 11, the rotation mechanism 64 is connected to a slide member 80 included in the retractable mechanism 66 so that the support member 62, the substrates 56 and 58 supported by the support member 62, the substrate connecting member 60, and the connectors 30 can swing. The rotation mechanism 64 has a rotating shaft 64a and a bearing 64b.

The rotating shaft 64a is a shaft member provided at the right end of a top surface of the slide member 80 along in the front and rear direction. The bearing 64b is provided on the support member 62, and is rotatably inserted into the rotating shaft 64a. Thus, the support member 62, the substrates 56 and 58 supported by the support member 62, and the connectors 30 can rotationally move (can swing) upward using the shaft center of the rotating shaft 64a as a rotation axis O1 (see FIG. 11). A helical torsion spring 64c is inserted into the front end of the rotating shaft 64a. One end of the helical torsion spring 64c is fastened with the slide member 80, and the other end is fastened with the support member 62. The helical torsion spring 64c is constantly biased to a direction in which the support member 62 rotationally moves downward.

Figure 12A:
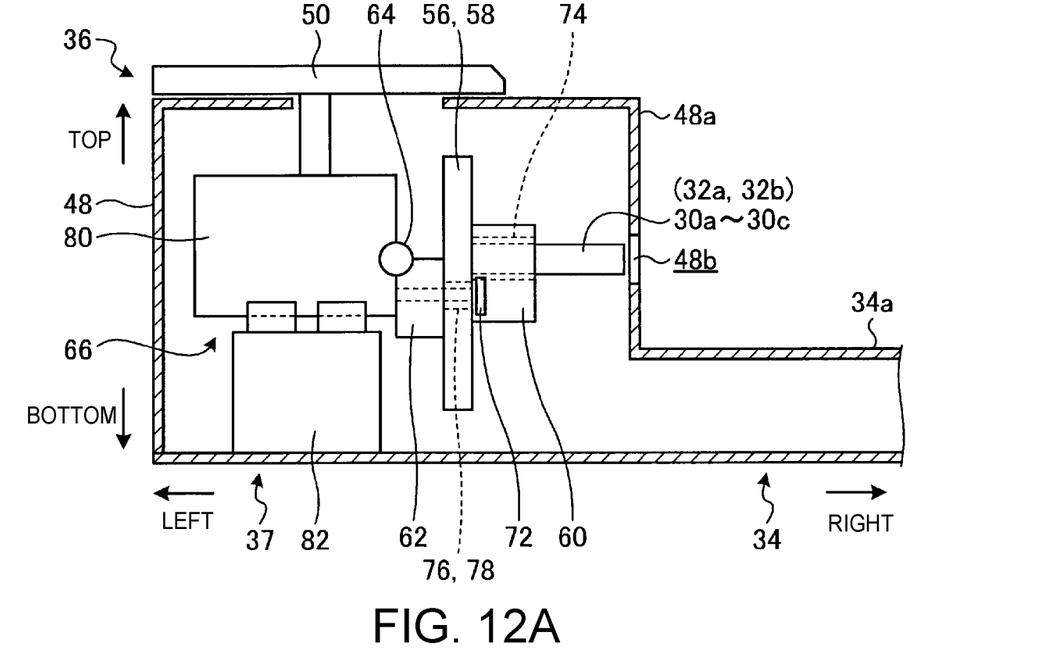
FIG. 12A is a partial cross-sectional side view schematically showing a state where the connectors are retracted in an opening of a box body.
Figure 12B:
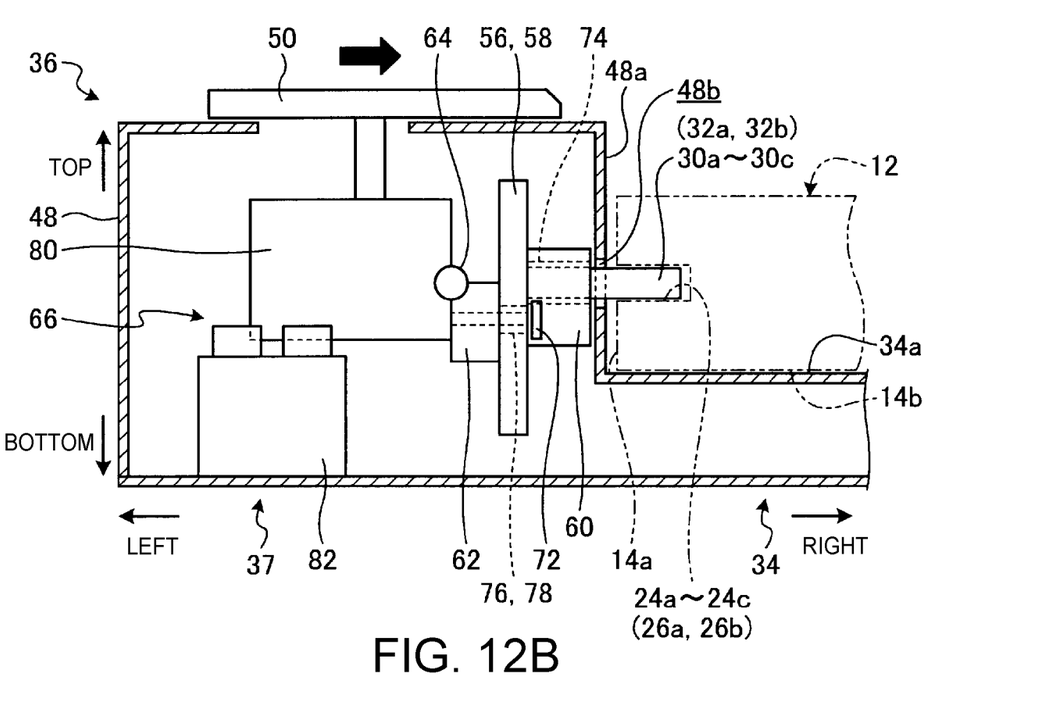
FIG. 12B is a partial cross-sectional side view schematically showing a state where the portable information device has been placed on a device placement portion, and the connectors have been extended out of the opening by using a retractable mechanism from the state shown in FIG. 12A.

FIG. 12A is a partial cross-sectional side view schematically showing a state where the connectors 30 are retracted in the opening 48b of the box body 48. FIG. 12B is a partial cross-sectional side view schematically showing a state where the portable information device 12 has been placed on the device placement portion 34, and the connectors 30 have been extended out of the opening 48b by using the retractable mechanism 66 from the state shown in FIG. 12A.

As shown in FIG. 12A, the retractable mechanism 66 is a mechanism that extends and retracts the connectors 30 from the opening 48b formed on the side surface 48a of the box body 48. The retractable mechanism 66 extends and retracts the connectors 30 from the opening 48b in accordance with an extending and retracting operation of the operation lever 50. The retractable mechanism 66 includes the operation lever 50, the slide member 80, and a slide base 82. The slide member 80 is supported on a top surface of the slide base 82 so that the slide member 80 can be extended and retracted in the right and left direction. The slide base 82 is fixed onto a bottom surface inside the device chassis 37. That is, the slide member 80 is supported by the device chassis 37 so that the slide member 80 can be extended and retracted in the right and left direction. The operation lever 50 is provided on the top surface of the box body 48 so as to be slidable in the right and left direction, and can be extended and retracted integrally with the slide member 80.

When the retractable mechanism 66 has slid the operation lever 50 in the right and left direction, the slide member 80 slides in the right and left direction, and as a result, the substrates 56 and 58 and the connectors 30 are extended and retracted in the right and left direction.

Subsequently, an operation of attaching the portable information device 12 to the docking device 10 is described.

In a state before the portable information device 12 is attached (an initial state), the docking device 10 is in an initial position where the operation lever 50 is retracted to the left (see FIG. 12A). In this state, the slide member 80 is also in an initial position where it is retracted to the left, and the connectors 30 are housed in the box body 48.

When the portable information device 12 is attached to the docking device 10 being in the initial state, first, the portable information device 12 is placed on the placement table 34a. That is, as shown in FIG. 4, with the rear end surface 14c positioned by the positioning member 52 and the side surface 14a positioned by the side surface 48a of the box body 48, the portable information device 12 is placed the placement table 34a. Thus, the bottom surface 14b of the portable information device 12 depresses the detection pin 40, and the engagement hole 14d is engaged with the engagement projection 38 (see FIG. 4). As a result, the connectors 30 and the connection terminals 24 are located facing each other.

Then, the operation lever 50 is slid to the right as shown in FIG. 8B. Thus, first, the guide pins 32a and 32b are inserted into the guide holes 26a and 26b, respectively, and then the connectors 30a to 30c are connected to the connection terminals 24a to 24c.

At this time, the two substrates 56 and 58 connected by the substrate connecting member 60 are capable of relative displacement to the support member 62 connected to the slide member 80 through the floating mechanisms 76 and 78. Therefore, when the portable information device 12 is placed on the docking device 10, even if there is some misalignment between the connectors 30 and the connection terminals 24, it is automatically adjusted by the workings of the floating mechanisms 76 and 78, and the connectors 30 are smoothly connected to the connection terminals 24.

Furthermore, the connector 30b provided on the first substrate 56 and the connector 30c provided on the second substrate 58 are capable of relative displacement through the floating mechanism 74. As described above, the connection terminals 24b and 24c of the portable information device 12 are surface-mounted on the device-side substrate 31 (see FIG. 3). Thus, slight misalignment between the connection terminals 24b and 24c is likely to occur at the time of a soldering process, and the pitch between them may deviate from a design value. Accordingly, the connectors 30b and 30c of the docking device 10 are configured to be mounted on the first substrate 56 and the second substrate 58, respectively, so that the pitch between them can be adjusted by the floating mechanism 74. Therefore, misalignment in the pitch between the connection terminals 24b and 24c is automatically adjusted, and the connectors 30b and 30c are smoothly connected to the connection terminals 24b and 24c.

Particularly in the docking device 10, the first substrate 56 fixed to the guide pins 32a and 32b is fixed to the substrate connecting member 60, and the second substrate 58 is floating-supported on the substrate connecting member 60. Therefore, when the connectors 30 are connected to the connection terminals 24, the guide pins 32 are inserted into the guide holes 26, and a position relationship between the connectors 30a and 30b on the first substrate 56 and the connection terminals 24a and 24b is defined, and after that, the connector 30c on the second substrate 58 is connected to the connection terminal 24c in a floating state. Thus, the connector 30c can be connected to the connection terminal 24c more smoothly.

It is to be noted that in the present embodiment, the detection pin 40 is depressed by the bottom surface 14b of the portable information device 12, which allows for a slide operation of the operation lever 50 through a link mechanism (not shown). That is, in the docking device 10, in a state where the portable information device 12 is not attached onto the placement table 34a, the connectors 30 are configured to be unable to be extended by the operation lever 50. Therefore, in the docking device 10, the portable information device 12 is prevented from being placed on the placement table 34a in a state where the connectors 30 are extended by mistake.

When the portable information device 12 mounted on the docking device 10 is removed, the operation lever 50 is moved to the left, and the connectors 30 are retracted and then pulled out from the connection terminals 24. At this time, the engagement of the engagement projection 38 with the engagement hole 14d is released through a link mechanism (not shown). As a result, the portable information device 12 can be smoothly removed from the device placement portion 34.

As described above, the docking device 10 according to the present embodiment includes at least the connectors 30b and 30c connected to the connection terminals 24b and 24c provided on the portable information device 12. Furthermore, the docking device 10 includes: the first substrate 56 with the connector 30b mounted thereon; the second substrate 58 with the connector 30c, which is different from the connector 30b mounted on the first substrate 56, mounted thereon; and the substrate connecting member 60 connecting between the connector 30b and the connector 30c in a floating state that allows relative displacement by the floating mechanism 74.

Misalignment in the pitch between, for example, the connection terminals 24b and 24c of the portable information device 12 may sometimes occur due to a manufacturing tolerance or a manufacturing error. Accordingly, in the docking device 10, the pitch between the connectors 30b and 30c is automatically adjusted by floating. Therefore, the connectors 30b and 30c can be smoothly and certainly connected to the connection terminals 24b and 24c.

The docking device 10 includes: the connectors 30a to 30c to be connected to the connection terminals 24a to 24c provided on the portable information device 12; and the support member 62 that supports the connectors 30a to 30c on the device chassis 37. Then, the connectors 30a to 30c are supported in a floating state that allows relative displacement to the support member 62 by the floating mechanisms 76 and 78. Therefore, even in a case where there is misalignment between the connectors 30a to 30c and the connection terminals 24a to 24c, it is automatically adjusted by floating, and the connectors 30 are smoothly connected to the connection terminals 24. These floating mechanisms 76 and 78 can be used in other configurations besides the above-described configuration in which the substrates 56 and 58 are connected by the substrate connecting member 60. For example, in a configuration in which one or multiple connectors are mounted on one substrate, one or multiple floating mechanisms 76 may be configured to support between the substrate and the support member 62 that supports this substrate.

The docking device 10 includes: the connectors 30a to 30c to be connected to the connection terminals 24a to 24c provided on the portable information device 12; and the support member 62 that supports the connectors 30a to 30c on the device chassis 37. Then, docking device 10 includes the rotation mechanism 64 that rotatably connects the support member 62 to the device chassis 37 so that the connectors 30a to 30c can swing along a direction in which the portable information device 12 is attached and removed. Specifically, the rotation mechanism 64 turns all of the connectors 30a to 30c connected to the side surface 14a of the portable information device 12 in a top and bottom direction with the rotation axis O1 along the front and rear direction as the rotation center so as to follow the movement of the portable information device 12 in a direction in which it is attached to and removed from the placement table 34a (in the present embodiment, the top and bottom direction). For example, let us think a case in which the portable information device 12 is forcibly lifted upward in a state where the portable information device 12 is mounted on the docking device 10 as shown in FIG. 12B. In this case, in the portable information device 12, with the side surface 14a connected to the connectors 30 as a rotation fulcrum, a side surface (a right side surface) on the side opposite to the side surface 14a is lifted upward, which may put an excessive load on the connectors 30 and the connection terminals 24. In this regard, the docking device 10 includes the rotation mechanism 64, and therefore the connectors 30a to 30c supported by the support member 62 rotationally move upward so as to follow the portable information device 12 forcibly lifted upward (see FIG. 11). As a result, it is possible to prevent an excessive load from being applied to the connectors 30 and the connection terminals 24 and possible to prevent them from being damaged. It is to be noted that the rotation mechanism 64 can also be effectively used for angle adjustment when the connectors 30 are connected to the connection terminals 24. The rotation mechanism 64 can be used in other configurations besides the above-described configuration in which the substrates 56 and 58 are connected by the substrate connecting member 60. For example, in a configuration in which one or multiple connectors are mounted on one substrate, the substrate may be configured to be rotatably connected to the support member 62 and the device chassis 37 (the slide member 80 in the above description) that support this substrate.

The docking device 10 has a side connection structure where the connectors 30a to 30c appearing out of the side surface 48a of the connection mechanism section 36 are connected to the connection terminals 24a to 24c provided on the side surface 14a of the portable information device 12. Thus, the distance from the guidepost (the positioning portion) 39, which positions the portable information device 12, to the connectors 30 is long, and a lot of parts, such as the retractable mechanism 66, lie between them. As a result, manufacturing tolerances or manufacturing errors of these parts are accumulated, thus it is difficult to enhance the position accuracy of the connectors 30. In this regard, the docking device 10 is equipped with the floating mechanisms 74, 76, and 78 and the rotation mechanism 64 described above, and therefore the connectors 30 can be more smoothly and certainly connected to the connection terminals 24.

Incidentally, the front end side of the portable information device 12 attached to the docking device 10 lands on the use surface 54, such as a top surface of a desk, as shown in FIG. 4. Therefore, if a portable information device 12 having a different dimension in the front and rear direction from the portable information device 12 shown in FIG. 2 is mounted, the landing spot on the use surface 54 is different, and therefore the angle posture is also different. As a result, the angle postures of the connection terminals 24a to 24c of the portable information device 12 vary.

Figure 13:
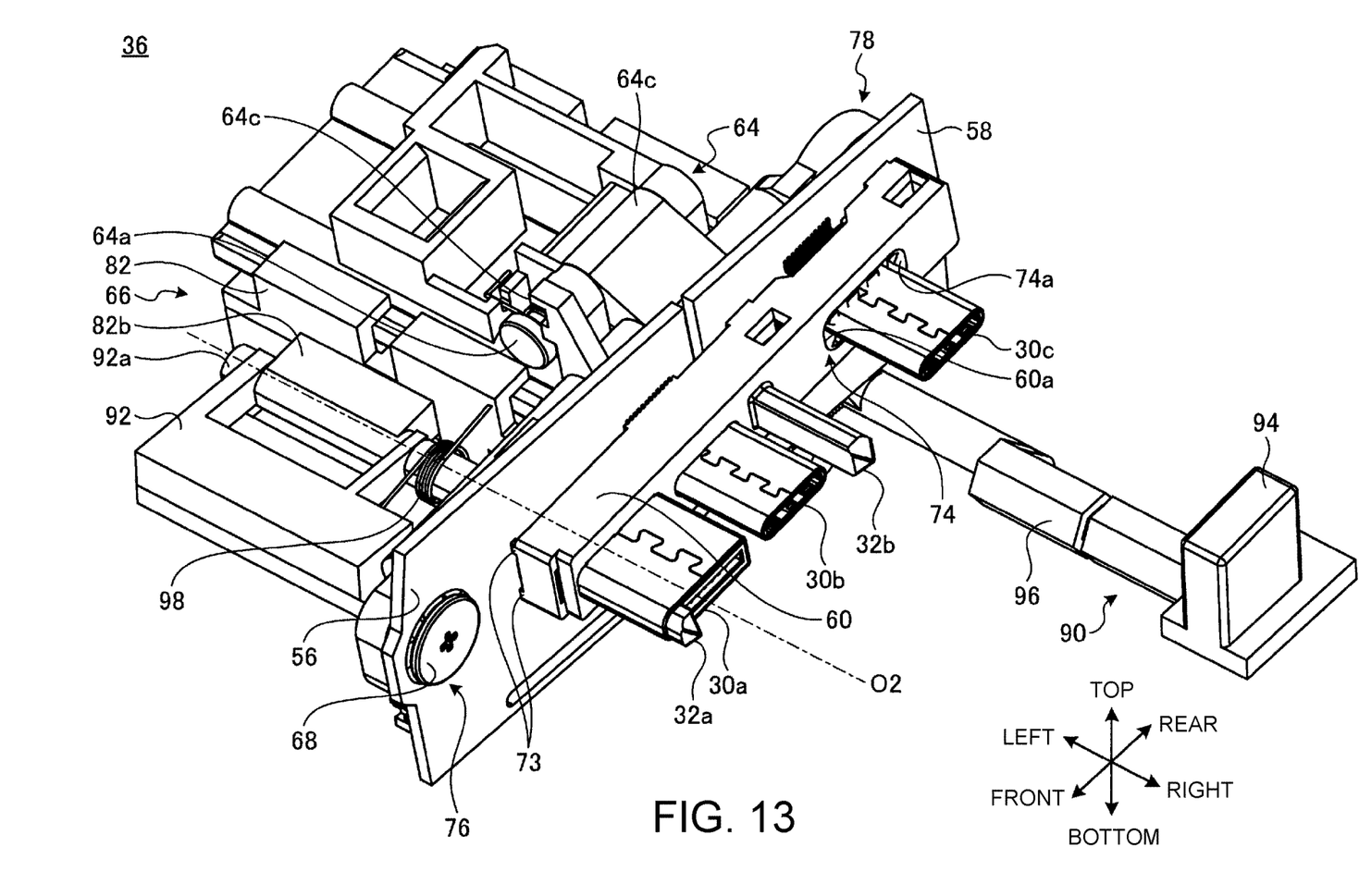
FIG. 13 is a perspective view showing a configuration example of the connectors and their surroundings in a configuration example where an angle adjusting mechanism is provided.

Accordingly, to cope with the attachment and removal of multiple types of portable information devices 12 having different dimensions in the front and rear direction, the docking device 10 may include an angle adjusting mechanism 90 capable of adjusting the angle postures of the connectors 30a to 30c (see FIG. 13). As shown in FIG. 13, the angle adjusting mechanism 90 includes a rotation base 92, a detecting member 94, and an interlocking member 96.

The rotation base 92 has a rotating shaft 92a along the right and left direction, and is fixed onto a bottom surface inside the device chassis 37. The rotating shaft 92a is rotatably inserted into a bearing 82a provided so as to project from a front end surface of the slide base 82. The slide base 82 can rotationally move upward with the shaft center of the rotating shaft 92a as a rotation axis O2. A helical torsion spring 98 is inserted into one end of the rotating shaft 92a. One end of the helical torsion spring 98 is fastened with the rotation base 92, and the other end is fastened with the slide base 82. The helical torsion spring 98 is constantly biased to a direction in which the slide base 82 rotationally moves downward. The detecting member 94 is provided, for example, instead of the left support leg 44 shown in FIG. 1 or side-by-side with the left support leg 44, and is configured to be able to appear out of a top surface of the flank portion 34b. The interlocking member 96 is a rod-like member connecting between the slide base 82 and the detecting member 94.

Therefore, when the portable information device 12 has been placed on the placement table 34a, the detecting member 94 of the angle adjusting mechanism 90 is depressed by the bottom surface 14b. At this time, the detecting member 94 goes down to a position depending on the angle posture of the placed portable information device 12. Thus, the slide base 82 rotationally moves centering around the rotation axis O2 to a rotation position depending on the angle posture of the placed portable information device 12 in conjunction with the detecting member 94. As a result, the slide member 80 takes the same angle posture as the slide base 82, and the connectors 30 are adjusted to take an angle posture corresponding to the connection terminals 24. Accordingly, the connectors 30 can be smoothly and certainly connected to the connection terminals 24.

At this time, in the docking device 10, with respect to the connector 30b of the first substrate 56 located on the proximal side from the rotation axis O2 of the angle adjusting mechanism 90, the connector 30c of the second substrate 58 located on the distal side from the rotation axis O2 is floating-supported by the floating mechanism 74. That is, after the angle adjustment by the angle adjusting mechanism 90, the floating mechanism 74 floating-supports the connector 30c that is most likely to be misaligned since it is located on the distal side from the rotation axis O2. Therefore, the connector 30c can be more certainly connected to the connection terminal 24c.

It is to be noted that the present invention is not limited to the above-described embodiment, and, needless to say, modifications can be freely made without departing from the scope of the invention.

In the above-described embodiment, there is provided an example of a configuration in which the connectors 30a to 30c appearing out of the side surface 48a of the connection mechanism section 36 are connected to the connection terminals 24a to 24c provided on the side surface 14a of the portable information device 12. However, the floating mechanisms 74, 76, and 78 and the rotation mechanism 64 may be applied to a configuration in which a connector is connected to a connection terminal provided on a bottom surface of a portable information device like the one disclosed in Japanese Patent No. 5064437.

In the above-described embodiment, there is provided an example of a configuration in which the floating mechanism 74, the floating mechanisms 76 and 78, and the rotation mechanism 64 are installed concurrently. However, the floating mechanism 74, the floating mechanisms 76 and 78, and the rotation mechanism 64 may be used separately.

As has been described, the present invention provides an improved docking device.

While the invention has been particularly shown and described with reference to a preferred embodiment, it will be understood by those skilled in the art that various changes in form and detail may be made therein without departing from the spirit and scope of the invention.

What is claimed is:

1. A docking device comprising:
   a device chassis; and
   a connection mechanism contained within said device chassis, wherein said connection mechanism includes
      a first substrate having a first connector mounted thereon;
      a second substrate having a second connector mounted thereon; and
      a substrate connecting member, securely connects to said first connector mounted on said first substrate, includes an opening for said second connector mounted on said second substrate to protrude through said opening such that said second connector is allowed to move within said opening when said second substrate is being moved relative to said substrate connecting member.

2. The docking device of claim 1, further comprising a support member that supports said substrate connecting member on said device chassis, wherein said substrate connecting member is allowed to be displaced relative to said support member.

3. The docking device of claim 2, further comprising a rotation mechanism that rotatably connects to support member in order to adjust an angle between a surface of said substrate connecting member and a side surface of a portable information device having connection terminals to be connected to said first and second connectors.

4. The docking device of claim 1, further comprising
   a device placement portion for receiving a portable information device having connection terminals to be connected to said first and second connectors.

5. The docking device of claim 4, further comprising a retractable mechanism for moving said supporting member and said first and second substrates in order to retract said first and second connectors from extending over said device placement portion.

6. The docking device of claim 1, further comprising an angle adjusting mechanism that adjusts an angle between a surface of said substrate connecting member and a side surface of a portable information device having connection terminals to be connected to said first and second connectors.

7. The docking device of claim 6, wherein said angle adjusting mechanism includes a rotation base, a detecting member, and an interlocking member.

8. The docking device of claim 1, wherein an elastic material is located between said second connector and a wall of said opening.

9. The docking device of claim 8, wherein said elastic material is rubber.

* * * * *